Figure 1:
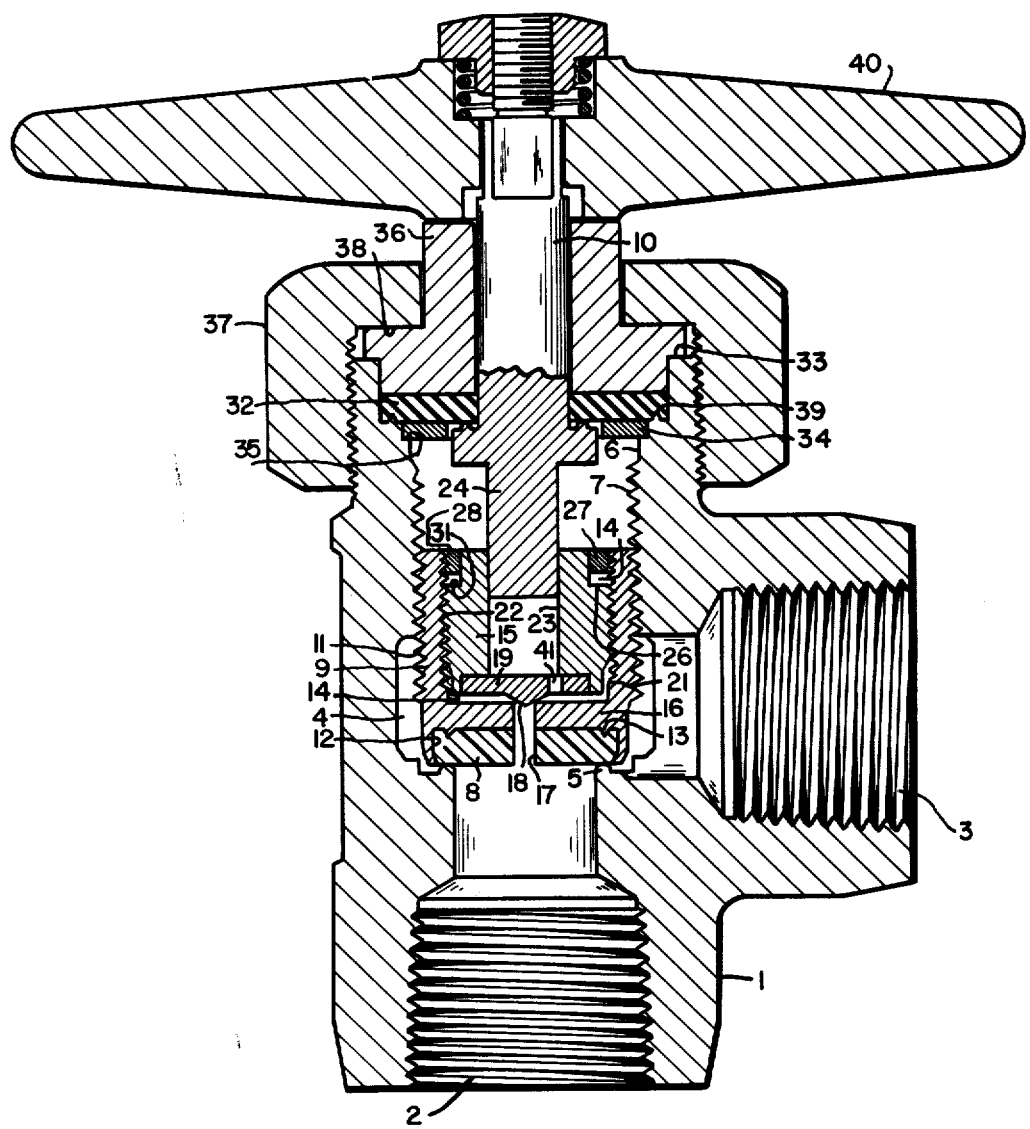

Nov. 19, 1963   D. E. HUGHES   3,111,141
HIGH PRESSURE VALVE
Filed Aug. 25, 1961   2 Sheets-Sheet 2

INVENTOR.
David E. Hughes
BY Webb, Mackey & Burden
HIS ATTORNEYS

United States Patent Office 3,111,141
Patented Nov. 19, 1963

3,111,141
HIGH PRESSURE VALVE
David E. Hughes, Pittsburgh, Pa., assignor to Superior Valve & Fittings Co., Pittsburgh, Pa., a corporation of Pennsylvania
Filed Aug. 25, 1961, Ser. No. 133,940
1 Claim. (Cl. 137—630.22)

This invention relates to high pressure valves for controlling flow of fluids under pressure, including both gases and liquids, and particularly to valves which regulate flow of gases such as nitrogen, hydrogen, helium, oxygen and other atmospheric ones at pressures up to 5000 p.s.i. and higher.

Heretofore high pressure valves for regulating flow of fluids under pressure generally have comprised a casing, inlet and outlet ports, a seat located between the inlet and outlet ports, and a valve member movable into and out of engagement with the seat to control the flow of fluids under pressure from the inlet to the outlet ports upon rotation of a stem connected to the valve member. In operation of these valves when connected into lines carrying gases at pressures of 2500 p.s.i. and higher, closing thereof has been easy because though pressures are at 2500 p.s.i. and higher on both the inlet and outlet sides of the seat, they are in balance. Thus, the amount of torque required to close the valve is merely that necessary to overcome friction between the movable valve member and the casing.

However, after shut-off, normally the high pressures are not present on the outlet side of the seat which is at atmospheric pressure; whereas, pressure on the inlet side of the seat is at least 2500 p.s.i. Under this condition, opening the valve calls for an amount of torque which includes not only that for overcoming the friction to turn the valve member, but also for surmounting additional friction resulting from the high pressure at 2500 p.s.i. on the inlet side of the seat. Presence of this high pressure only on the inlet side presents an unbalanced pressure condition and adds materially to the amount of torque required for opening the valve. For example, an operator who exerted almost all the force he could to close the valve can not possibly open it after drop in pressure to atmospheric level on the outlet side of the seat. Accordingly, opening of high pressure valves has been a problem to users thereof.

Most, if not all, high pressure valves presently in use in high pressure systems lack ability to slowly release fluid under pressure into a low pressure line or vessel connected downstream of the valve. Generally, when these valves are opened, despite efforts to effect a slow, controlled release of the fluid under pressure, there is a rapid release thereof into the low pressure part of the system. In high pressure oxygen systems, this presents two particularly dangerous problems. The first one is that of recompression, wherein rapid release of oxygen under pressure into the low pressure line or vessel produces shock waves. These shock waves reverberate and impact against each other to heat up the molecules of oxygen and the surrounding walls of the low pressure line or vessel. Accordingly, any flammable material therein ignites and in the presence of oxygen, an explosion may readily occur.

The second problem is one of friction arising from a rapid flow of molecules of oxygen into the low pressure part of the system when the valve is opened. This friction generates heat which ignites flammable material such as oil, grease, etc. in the system, so that in the presence of oxygen, an explosion is a good probability. Of course, in high pressure lines normally there is no high velocity in gas flow and no friction problem.

My invention not only overcomes the two foregoing problems, but also permits easy opening of the valve when there is low pressure on the outlet side of the seat. Specifically, my high pressure valve comprises a casing, inlet and outlet ports and a seat interposed between the inlet and outlet ports. In the casing is a movable head disposed for carrying a seat engaging member into and out of engagement with the seat to regulate flow of fluid under pressure from the inlet port to the outlet port. The head has a chamber therein and a small or restricted passageway extends through the seat engaging member mounted by the head to interconnect the chamber and the inlet port. Disposed in the chamber is a plug which has a closure engageable with the opening of the small passageway into the chamber to control flow of fluid under pressure thereinto.

The plug is limitedly movable in the chamber independently of movement of the head, to advance the closure through a path between a first position whereat the closure engages the opening to prevent flow of fluid under pressure into the chamber and a second position whereat the closure is out of engagement with the opening. In the chamber is a stop means positioned for engagement with the plug in the second position.

A rotatable stem is in engagement with the plug for moving it to and from the first and second positions and for moving the head to carry the seat member out of contact with the seat upon further rotation of the stem after the plug has reached the second position. The stem also moves the seat member onto the seat by a means such as a hand wheel connected thereto.

The chamber in the head and the outlet port are in fluid under pressure connection.

In the accompanying drawings, I have shown a preferred embodiment of my invention in which:

FIGURE 1 is a vertical section view of my high pressure valve; and

Figure 2:
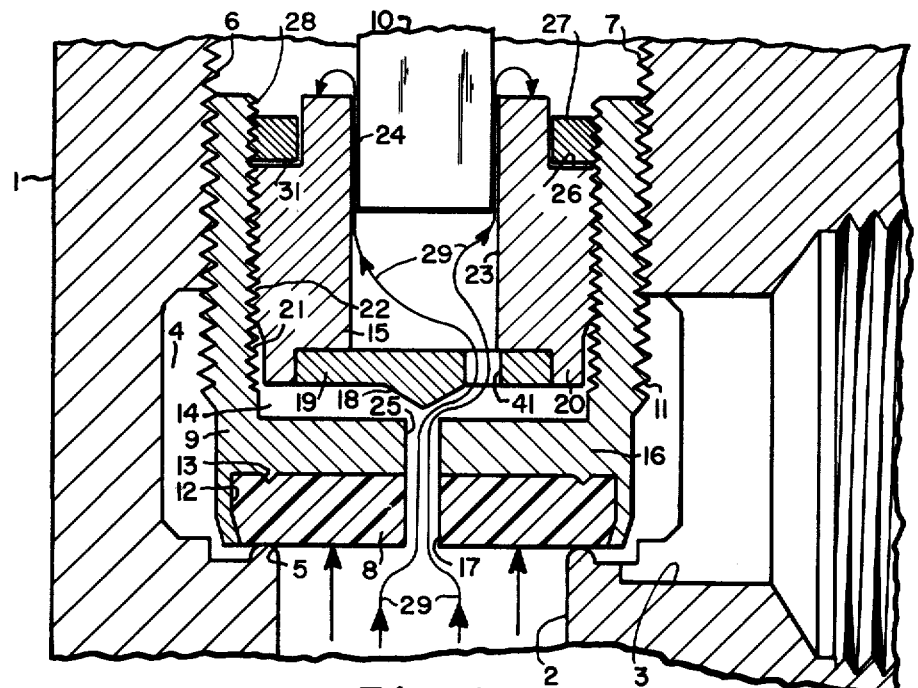
Figure 3:
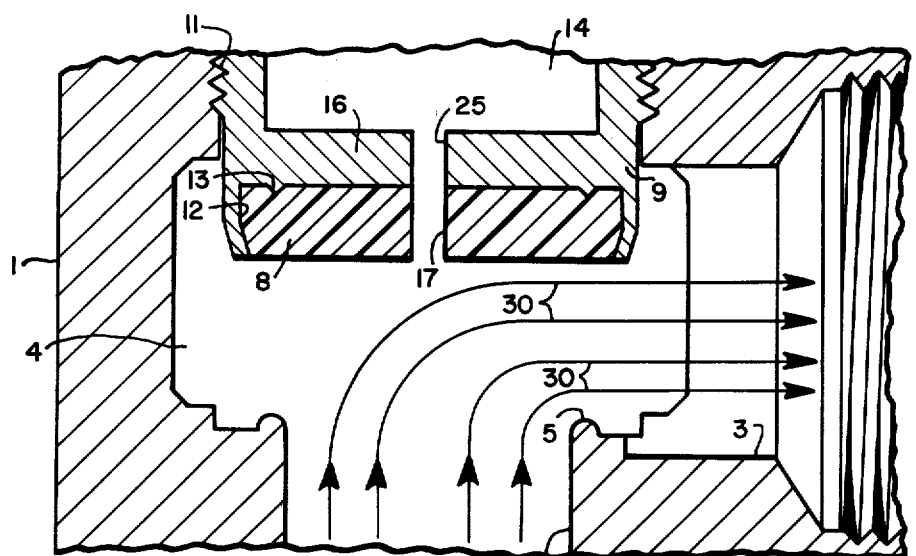

FIGURES 2 and 3 inclusive are enlarged views of that part of FIGURE 1 showing the seat plug and head in different positions when opening the valve.

Referring to FIGURES 1–3 inclusive, the high pressure valve comprises a casing 1, an inlet port 2 and an outlet port 3 intersecting at right angles to one another to form an enclosed space 4 within the casing. While the ports are shown as interconnecting at right angles to one another, they may be in line or at any other angular disposition. Each port is threaded to receive the end of a fluid under pressure line, pipe, conduit, tubing, etc.

At the intersection of the ports and at the opening of the inlet port 2 into the enclosed space 4 is a seat 5. Extending vertically from the enclosed space and out through the top of the casing is a bore 6 axially in line with the seat and having threads 7 running upwardly from the top of the enclosed space along a part of the length of the bore.

Regulation of flow of fluid under pressure from the inlet port 2 to the outlet port 3 results from travel of a seat engaging member such as a seat disc 8 into and out of engagement with the seat 5. This seat disc is carried by an assembly or head 9 which is disposed in the bore 6 and which is advanced to and moved away from the seat by a rotatable stem 10 in engagement therewith. The head 9 has peripheral threads 11 which engage the threads 7 of the bore 6 so that rotation of the stem 10 in the appropriate direction moves the seat disc 8 carried by the head 9 into and out of engagement with the seat 5.

Preferably the seat disc is made of a somewhat resilient material adapted for providing complete shut-off of flow of fluid under pressure from the inlet port to the outlet port. Examples of materials suitable for the seat disc include nylon, polymers of trifluorochloroethylene, tetrafluoroethylene, and phenolic resins.

As shown in FIGURE 1, the seat disc 8 is mounted in a receptacle 12 at the lower end of the head 9. To prevent leakage of fluid under pressure in between the seat disc 8 and that part of the head defining the receptacle 12, a small projection ring 13 formed as a part of the receptacle extends into the disc and forms an effective fluid under pressure seal between the head and the disc.

Interiorly of the head is a chamber 14 which contains a movable plug 15 disposed for limited travel therein independently of movement of the head 9. Extending through the seat disc 8 and through the bottom part 16 of the head 9 which forms a part of the receptacle is a small or restricted passageway 17 opening into the chamber 14 to interconnect it with the inlet port 2. Flow of fluid under pressure from the inlet port 2 into the chamber 14 is controlled by a closure 18 which is a part of a plate 19 unattached to but seated by the lower end 20 of the plug 15. Of course, the plate 19 need not be unattached from the plug but can be attached thereto. Preferably, the closure and the plate are made from a metal such as steel, stainless steel, etc. and the head is also made from a metal such as steel, silicon and aluminum-bronze alloys, nickel-copper alloys, etc. to provide a metal-to-metal contact between the closure and the opening 25.

The side walls of the chamber 14 have threads 21 which are engaged by peripheral threads 22 of the plug 15 to provide limited travel of the plug 15 within the chamber 14 upon rotation thereof. A square shaped pocket 23 in the plug 15 receives the lower end 24 of the stem 10 which is also square shaped so that turning of the stem 10 imparts rotation to the plug 15 to move it over the threads 21.

The limited travel of the plug 15 in the chamber 14 is defined by a first position whereat the closure 18 engages the opening 25 of the restricted passageway 17 into the chamber 14 as shown in FIGURE 1 to prevent flow of fluid under pressure thereinto and by a second position whereat a shoulder 26 of the plug 15 engages a lock nut 27 located at the top 28 of the chamber 14 as shown in FIGURE 2. The distance between first and second positions is substantially that of a one-half turn of the stem 10. From FIGURES 1 and 2 it is seen that this limited travel of the plug is independent of movement of the head 9 because rotation of the stem 10 advances the plug without turning the head 9.

When the plug 15 has moved to the second position, the fluid under pressure in the inlet port lifts the closure 18 from the opening 25 and flows into the chamber 14, then through orifice 41 of the plate 19 into pocket 23, and next in between stem 10 and the walls of the pocket 23 to bore 6 as shown by arrows 29 in FIGURE 2. From the bore 6, the fluid under pressure travels in between threads 7 and 11 into the space 4 and into the outlet 3.

The chamber 14, threads 7, 11, 21 and 22, bore 6 and pocket 23 are in fluid under pressure connection with the outlet port 3. In other words, once the closure has lifted off opening 25 into the chamber 14, fluid under pressure escapes from the restricted passageway 17 into the chamber 14 and then into the enclosed space 4 through the bore 6, threads and pocket and finally to the outlet port 3 to produce a slow build up of pressure downstream of the outlet port. Accordingly, the recompression and friction problems described are overcome and the explosion hazard eliminated. Since the threads of the bore, head, chamber and plug do not provide a fluid under pressure seal, the orifice 41 in the plate can be eliminated because the chamber, threads, bore and enclosed space are in fluid under pressure connection with the outlet port.

When the stem has rotated the plug to the second position, further rotation thereof turns the head and raises the seat disc 8 off the seat 5 to open the valve as shown in FIGURE 3 to permit full flow of fluid under pressure directly from inlet port 2 to outlet port 3 as shown by arrows 30. To prevent the plug from removing the lock nut 27 from the head upon further rotation of the stem after the plug has reached the second position, a spacer element 31 is placed on a part of the shoulder 26 of the plug 15 to cock it in the second position and avoid extraction of the lock nut from the head. Other elements which may be substituted for the spacer one include lugs, balls, wire, etc. Additionally, peening of the lock nut 28 and the head 9 will resist removal of the lock nut from the head by the plug.

With the valve open, the first half rotation of the stem 10 for closing advances the plug from the second position to the first position anwd brings the closure 18 into engagement with the opening 25 to close the restricted passageway and does not move the head 9 towards the seat 5. Then additional rotation of the stem 10 after the plug has reached the first position turns the head and advances the seat disc towards and into engagement with the seat 5 thereby closing the valve.

A gasket 32 surrounds a part of the stem 10 above the head 9 and rests upon a first shoulder 33 of the bore 6 to provide a fluid under pressure seal for the top of the casing and the stem. A ring 34 disposed upon a second shoulder 35 of the bore engages the under side of the gasket 32 and a collar 36 fits against the upper side of the gasket and receives a part of the length of the stem in its bore. To clamp the gasket down upon the first shoulder 33 of the bore 6 for effecting the seal, a threaded cap 37 screws onto the top of the casing and engages a shoulder 38 of the collar 36. To assist in providing fluid under pressure tightness between the gasket and the casing, a second small projection ring 39 similar to the first-mentioned projection ring is a part of the first shoulder 33 and extends into the gasket.

A hand wheel 40 mounted upon the upper end of the stem above the casing permits easy rotation of the stem to move both the plug 15 through its limited path of travel and the head 9 along the threads of the bore 6 for opening and closing the valve.

When the valve is closed, as shown in FIGURE 1, threads 7 and 11 are subjected to the full pressure in the inlet 2, thereby increasing materially the amount of torque required to turn the head 9 upon those threads for opening the valve. This amount of torque is reduced to that required to overcome friction which resists rotation of the head upon those threads 7 and 11 by balancing the pressure on the inlet and outlet sides of the seat 5. The balance of pressure results from flow of fluid under pressure through the restricted passageway 17 into the chamber, pocket, bore, space 4 and outlet 3 upon travel of the plug from the first position (FIGURE 1) to the second position (FIGURE 2). Accordingly, in operation of my valve, before the seat disc 8 lifts off its seat 5 to provide full flow of fluid under pressure from the inlet port to the outlet port, the closure raises and permits flow of fluid under pressure as shown by arrows 29 in FIGURE 2. This equalizes pressure on the inlet and outlet sides of the seat thereby making raising of the seat disc off its seat easy because then turning the stem merely requires enough torque to overcome the friction between the threads of the bore and the threads of the head.

While threads 21 and 22 are subjected to that amount of fluid under pressure in the restricted passageway 17 when the valve is closed (FIGURE 1), the amount of torque required for turning the plug upon those threads is little more than that needed for overcoming friction of rotation. This is because the diameter of the passageway 17 is small compared to the diameter of the plug.

My high pressure valve has important advantages for users of high pressure gas systems because it not only permits easy opening of the valve when the outlet port is at low pressure, but also overcomes the recompression and friction problems described herein. Surmounting of these two problems is particularly important when oxygen under high pressure is used in systems where flammable material such as grease and oil may be present.

While I have shown and described a preferred embodiment of my invention, it may be otherwise embodied within the scope of the appended claim.

I claim:

In a high pressure valve having a casing, inlet and outlet ports and a seat interposed between said inlet and outlet ports, the invention comprising a movable head disposed in said casing for travel therein to carry a seat engaging member into and out of engagement with said seat thereby regulating flow of fluid under pressure from said inlet port to said outlet port, said head mounting said seat engaging member and having a chamber therein, a small passageway extending through said seat engaging member to interconnect said chamber and said inlet port, a plug in said chamber and having a closure engageable with the opening of said small passageway into said chamber to control flow of fluid under pressure into said chamber, said plug being limitedly movable in said chamber independently of movement of said head to advance said closure through a path between a first position whereat said closure engages said opening to prevent flow of fluid pressure into said chamber and a second position whereat said closure is out of engagement with said opening, stop means in said chamber positioned for engagement with said plug at said second position, a rotatable stem in engagement with said plug for moving it to and from said first and second positions and for moving said head to carry said seat engaging member out of engagement with said seat upon further rotation of said stem after said plug has reached said second position and for moving said seat engaging member onto said seat, and means connected to said stem for rotating it said head and said casing having cooperating threads for movement of said head in said casing, said chamber being in fluid under pressure connection with said cooperating threads and said outlet port, said seat engaging member being made from a resilient material and said head having projection means extending into a part of said resilient material to provide a fluid under pressure seal between said head and said seat engaging member.

References Cited in the file of this patent

UNITED STATES PATENTS

| | | |
|---|---|---|
| 594,633 | Lunken | Nov. 30, 1897 |
| 1,870,293 | Miller | Aug. 9, 1932 |

FOREIGN PATENTS

| | | |
|---|---|---|
| 579,297 | Canada | July 14, 1959 |

UNITED STATES PATENT OFFICE

CERTIFICATE OF CORRECTION

Patent No. 3,111,141             November 19, 1963

David E. Hughes

It is hereby certified that error appears in the above numbered patent requiring correction and that the said Letters Patent should read as corrected below.

Column 4, line 15, for "anwd" read -- and --; column 5, line 24, for "fluid pressure" read -- fluid under pressure --.

Signed and sealed this 28th day of April 1964.

(SEAL)
Attest:

ERNEST W. SWIDER             EDWARD J. BRENNER
Attesting Officer             Commissioner of Patents